United States Patent [19]

Kuzma

[11] Patent Number: 5,758,194
[45] Date of Patent: May 26, 1998

[54] COMMUNICATION APPARATUS FOR HANDLING NETWORKS WITH DIFFERENT TRANSMISSION PROTOCOLS BY STRIPPING OR ADDING DATA TO THE DATA STREAM IN THE APPLICATION LAYER

[75] Inventor: Andrew J. Kuzma, Portland, Oreg.

[73] Assignee: Intel Corporation, Santa Clara, Calif.

[21] Appl. No.: 887,525

[22] Filed: Jul. 3, 1997

Related U.S. Application Data

[63] Continuation of Ser. No. 634,952, Apr. 19, 1996, abandoned, which is a continuation of Ser. No. 159,835, Nov. 30, 1993, abandoned.

[51] Int. Cl.$^6$ .................................................. G06F 13/00
[52] U.S. Cl. .............. 395/886; 395/200.61; 395/200.76; 395/850; 395/831
[58] Field of Search ................ 395/200.61, 200.76, 395/831, 850, 886

[56] References Cited

U.S. PATENT DOCUMENTS

| | | | |
|---|---|---|---|
| 4,386,416 | 5/1983 | Giltner et al. | 395/888 |
| 4,546,429 | 10/1985 | Chan et al. | 395/865 |
| 4,663,732 | 5/1987 | Robinson | 395/250 |
| 4,750,171 | 6/1988 | Kedar et al. | 370/85 |
| 4,754,451 | 6/1988 | Eng et al. | 370/60 |
| 4,872,162 | 10/1989 | Tanaka et al. | 370/85.12 |
| 4,947,366 | 8/1990 | Johnson | 395/823 |
| 4,970,666 | 11/1990 | Welsh et al. | 364/522 |
| 5,010,499 | 4/1991 | Yee | 348/552 |
| 5,040,170 | 8/1991 | Upp et al. | 359/135 |
| 5,077,732 | 12/1991 | Fischer et al. | 370/85.4 |
| 5,121,202 | 6/1992 | Tanoi | 358/136 |
| 5,196,933 | 3/1993 | Henot | 358/136 |
| 5,227,875 | 7/1993 | Suu et al. | 358/133 |
| 5,307,413 | 4/1994 | Denzer | 370/49 |
| 5,341,374 | 8/1994 | Lewen et al. | 370/85.4 |
| 5,347,516 | 9/1994 | Yoshida | 370/94.1 |
| 5,371,607 | 12/1994 | Hannina et al. | 358/402 |
| 5,416,520 | 5/1995 | Kuzma | 348/409 |
| 5,579,055 | 11/1996 | Hamilton et al. | 348/476 |

OTHER PUBLICATIONS

K. Y. Eng, et al., "A Framework For A National Broadband (ATM/B–ISDN) Network", 1990 IEEE, pp. 308.7.1–308.7.6.

Magda El Zarki, et al., "A Routing Scheme for Hierarchically Structured LAN/WAN Networks" 1989 IEEE, pp. 11.3.1–11.3.5.

(List continued on next page.)

Primary Examiner—Thomas C. Lee
Assistant Examiner—Po C. Huang
Attorney, Agent, or Firm—Blakely, Sokoloff, Taylor & Zafman

[57] ABSTRACT

A gateway protocol wherein networks having differing transmission capabilities are linked through a common gateway. Data propagated by nodes on a lesser-capable network is considered base data while data transmissions on the more capable network are considered enhanced transmissions, wherein the enhanced data includes a base data component plus an enhanced data component. The gateway protocol in one embodiment processes communications between nodes on the differing networks. In a transmission going from the more-capable network to the lesser-capable network, the enhanced component of the data is stripped at the gateway while the base component is forwarded to the receiving node. In the opposite direction, a transmission from the lesser-capable network is processed at the gateway by having null data added to the base data where the enhanced data would be expected in the more-capable network protocol. In another embodiment nodes can be equipped with logic which identifies to what kind of network they are communicating. At the node end of a transaction in a more-capable network, the transmission's stream can be stripped to accommodate a receiving node on a lesser-capable network. Finally, applications software can be written to implement "smart" object filters for breaking down data in a hierarchical manner.

13 Claims, 3 Drawing Sheets

OTHER PUBLICATIONS

Torsten Braun, et al., "A Transputer Based OSI–Gateway for LAN–Interconnection across ISDN", 1991 IEEE, pp. 158–165.

W. Johannsen et al., "Architecture and Design of an Open Systems LAN/WAN Gateway", 1988 IEEE, pp. 112–119.

Cui–Qing Yang et al., "Building Multi–Way Gateways for Local Area Networks", 1989 IEEE, pp. 278–284.

G. Juanole et al., "On Gateway for Internetworking through ISDN: Architecture and Formal Modelling with Petri Nets", 1989 IEEE, pp. 458–467.

"Video Conquers the Desktop", *Byte*, Sep. 1993, pp. 64–80.

"A Standards–Based Multimedia Conferencing Bridge", *AT&T Technical Journal*, Jan./Feb. 1993, pp. 41–49.

"Image and Video Coding Standards", *AT&T Technical Journal*, Jan./Feb. 1993, pp. 67–89.

COMMUNICATION APPARATUS FOR HANDLING NETWORKS WITH DIFFERENT TRANSMISSION PROTOCOLS BY STRIPPING OR ADDING DATA TO THE DATA STREAM IN THE APPLICATION LAYER

This is a continuation of application Ser. No. 08/634,952, filed Apr. 19, 1996, now abandoned, which is a continuation of application Ser. No. 08/159,835, filed Nov. 30, 1993; abandoned.

BACKGROUND OF THE INVENTION

1. Field the Invention

The present invention relates to the transmission of information over heterogeneous networks. More particularly, the present invention relates to gateway and hierarchical data protocol for linking networks with differing data handling capabilities.

2. Art Background

Until recently, telecommunications and computing were considered to be entirely separate disciplines. Telecommunications was analog and done in real time whereas computing was digital and performed at a rate determined by the processing speed of a computer. Today, such technologies as speech processing, electronic mail and facsimile have blurred these lines. In the coming years, computing and telecommunications will become almost indistinguishable in a race to support a broad range of new multimedia (i.e., voice, video and data) applications. These applications are made possible by emerging digital-processing technologies, which include: compressed audio (both high fidelity audio and speech), high resolution still images, and compressed video. The emerging technologies will allow for collaboration at a distance, including video conferencing.

Of these technologies, video is particularly exciting in terms of its potential applications. But video is also the most demanding in terms of processing power and shear volume of data to be processed. Uncompressed digital video requires somewhere between 50 and 200 Mb/s (megabits per second) to support the real-time transmission of standard television quality images. This makes impractical the widespread use of uncompressed digital video in telecommunications applications.

Fortunately, there is considerable redundancy in video data, both in terms of information theory and human perception. This redundancy allows for the compression of digital video sequences into lower transmission rates. For some time, researchers have been aware of a variety of techniques that can be used to compress video data sequences anywhere from 2:1 to 1000:1, depending on the quality required by the application. Until recently, however, it was not practical to incorporate these techniques into low cost video-based applications.

Two important methods of data compression for video information are used widely throughout the various standards for video communication. These are the concepts of frame differencing and motion compensation. Frame differencing recognizes that a normal video sequence has little variation from one frame to the next. If, instead of coding each frame, only the differences between a frame and the previous frame are coded, then the amount of information needed to describe the new frame will be dramatically reduced. Motion compensation recognizes that much of the difference that does occur between successive frames can be characterized as a simple translation of motion, caused either by the moving of objects in the scene or by a pan of the field of view. Rather than form a simple difference between blocks in a current frame and the same block in the previous frame, the area around those blocks can be searched in the previous frame to find an offset block than more closely matches the block of the current frame. Once a best match has been identified, the difference between a reference block in the current frame and the best match in the previous frame are coded to produce a vector that describes the offset of the best match. This motion vector then can be used with the previous frame to produce the equivalent of what the current frame should be. These methods, and others are incorporated into systems which make possible the rapid transmission of real-time video information.

A number of standards have been recently developed for such activities as video conferencing, the transmission and storage of standard high quality still images, as well as standards for interactive video playback to provide interoperability between numerous communications points. The standards recognize a need for quality video compression to reduce the tremendous amount of data required for the transmission of video information. These standards include the H.261/Px64 standards promoted by the International Telegraph and Telephone Consultative Committee (CCITT), the JPEG standard for still image compression and the MPEG standards for real-time motion video standards. Likewise, audio standards have been developed for transmission including the G.711/722/728 standards.

These various standards rely on the ability to communicate information at rates not necessarily compatible with today's networking and interconnect technologies. For example, the H.261 standard defines a scheme for sending video at speeds from 64 Kbps to 2 Mbps. At the low end of the spectrum, H.261 fits into an ISDN channel while at the high end, it requires wider-bandwidth dedicated lines. Some of the hardware required to support H.261 at its fullest potential can be very, very expensive. Yet, there will be implementations of high-bandwidth protocols because of the enhanced results achievable by networks using them.

As the worlds of telecommunications and computers blend closely together, the telecommunications aspects of communications will have to contend with some of the constraints of the computer world. Particularly, video and audio conferencing over existing computer networks will prove a challenge in that maintaining real time information communication over traffic-burdened existing network protocols may prove insurmountable. Further, prior-existing networks will not be able to handle the volume of data required for the highest resolution video and audio that newer advanced networks will process. Yet, there will be a need for stations on lower bit-rate networks to communicate with stations on higher-end networks. The inherent limitations of some of the links in a heterogeneous conference limit the ability of the participants in terms of sharing audio/data/video streams. A common approach is to limit all the conference participants to the lowest common denominator. For example, if one participant handled only low-rate code-over-voice, then all participants would mimic the same level of performance. From a user's point of view, this approach is workable but not desirable as it is a poor use of expensive resources. It is therefore an object of the present invention to provide an architecture in which networks having varying data transmission capabilities are able to communicate without compromising transmission quality when it is not necessary.

SUMMARY OF THE INVENTION

From the foregoing, it can be appreciated that there is a need for a mechanism for allowing computer stations on networks having varying data transmission capabilities to communicate at each station's optimal ability. It is therefore an object of the present invention to provide a method and apparatus as a gateway and data sharing protocol between communications networks operating under different transmission protocols.

These and other objects of the present invention are provided by introducing a gateway protocol wherein networks having differing transmission capabilities are linked through a common gateway. Data propagated by nodes on a lesser-capable network is considered base data while data transmissions on the more capable network are considered enhanced transmissions, wherein the enhanced data comprises a base data component plus an enhanced data component. The gateway protocol in one embodiment processes communications between nodes on the differing networks. In a transmission going from the more-capable network to the lesser-capable network, the enhanced component of the data is stripped at the gateway while the base component is forwarded to the receiving node. In the opposite direction, a transmission from the lesser-capable network is processed at the gateway by having null data added to the base data where the enhanced data would be expected in the more-capable network protocol. In another embodiment of the present invention nodes can be equipped with logic which identifies to what kind of network they are communicating. At the node end of a transaction in a more-capable network, the transmission's stream can be stripped to accommodate a receiving node on a lesser-capable network. Finally, applications software can be written to implement "smart" object filters for breaking down data in a hierarchical manner.

BRIEF DESCRIPTION OF THE DRAWINGS

The objects, features and advantages of the present invention will be apparent from the following detailed description in which.

DETAILED DESCRIPTION OF THE INVENTION

A method and apparatus are described for the implementation of a gateway protocol to be used in heterogeneous networks. Although the present invention is described predominantly in terms of communications between two particular types of networks, the concepts and methods are broad enough to encompass communications among numerous interconnections of differing transmission capabilities. Throughout this detailed description, numerous details are specified such as relative bit rates and data types, in order to provide a thorough understanding of the present invention. To one skilled in the art, however, it will be understood that the present invention may be practiced without such specific details. In other instances, well-known control structures and gate level circuits have not been shown in detail in order not to obscure unnecessarily the present invention. Particularly, many functions are described to be carried out by implemented logic circuits. Those of ordinary skill in the art, having been described the various functions to be carried out by these logic circuits will be able to implement them without undue experimentation. Numerous technologies exist today for the implementation of defined logic such as the use of programmable logic arrays (PLA) or other, hard-wired, circuitry. Additionally, circuitry for massaging data streams as described herein are generally well-known and any suitable technology may be used to implement the present invention.

Figure 1:
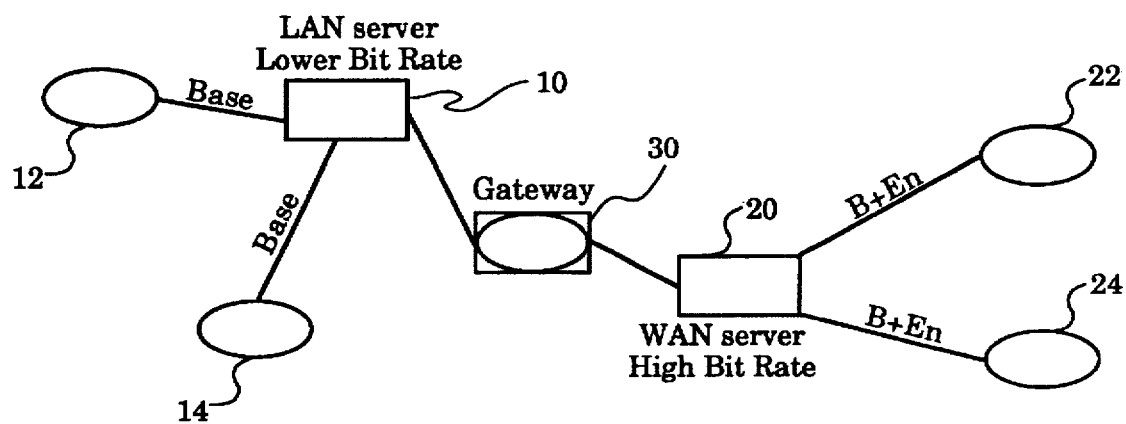
FIG. 1 illustrates an arbitrary topology of differing networks coupled by a common gateway in accordance with the present invention.

In heterogeneous network multimedia conferences, it is likely that both the video and audio data rates of the member networks will differ on each network type because of the desire to efficiently utilize the bandwidth for each network connection type to give an acceptable overall quality of service. As an example, FIG. 1 is illustrated to consider local area network (LAN) connections in conference with wide area network (WAN) connections. An LAN server 10 is shown coupled to two LAN nodes 12 and 14. Likewise, a WAN server 20 is shown coupled to WAN nodes 22 and 24. The two network servers are in communication through a gateway or bridge 30. This gateway 30 may also incorporate multi-point control unit functionality.

In the example of FIG. 1, the average bandwidth available over the LAN is less than the bandwidth available over WAN due to the bursty nature of local area networks. The LAN server is assumed to provide an average bandwidth of 60 Kbps which reflects present Current Sense Multiple Access (CSMA) LAN technology under loading. The WAN server is assumed to be an ISDN connection such as a digital PBX which provides 128 Kbps as a switched circuit connection.

The scheme implemented by the present invention is to scale the natural data compression in a hierarchical manner, both in the encoding and in the transmission of information. The hierarchical coding of the natural data involves a multi-stage encode/decode of the already-implemented network-based compression algorithms. The hierarchical transmission involves encapsulating the hierarchical compressed data so that it can be efficiently stripped or augmented at the heterogeneous network interface such as the gateway 30. In the general case, the multimedia conference network connection with the lowest bandwidth characteristics should be chosen as the "base conference". In the multimedia conference instance supported by FIG. 1, the LAN behavior is used as the basis of the basis coding. In this two-network connection, the LAN connection parameters are denoted with the subscript 'b' for "base", and the WAN connection parameters with the subscript 'e' for "enhanced". Of course, it is possible create many levels between the base service and the most enhanced service in a complex heterogeneous network. The principle will be described in the two-network case with the extrapolation to more networks being made clear by the procedure described.

Typical video conference data types include document data (traditional data), compressed audio data, and compressed video data. The video compression algorithm implemented on the network providing the enhanced capability generates data that represents the compressed image into two distinct streams: a base data component and an enhancement data component. This is represented by the nomenclature:

$$V = V_b + V_e.$$

The enhanced audio compression algorithm generates two audio data streams:

$$A = A_b + A_e.$$

While the traditional data source generates two data streams:

$$D = D_b + D_e.$$

Figure 2:
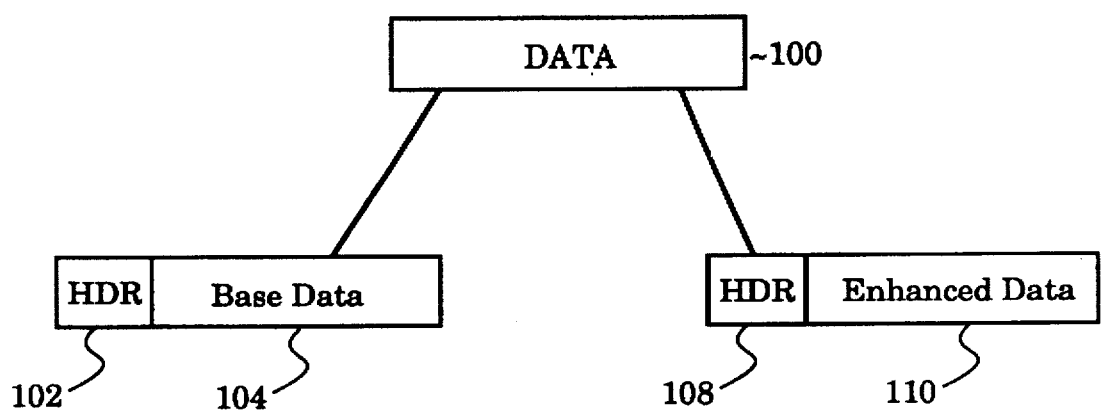
FIG. 2 illustrates the separation of hierarchical data into its constituent components for use by the present invention.

The enhanced data streams are multiplexed such that it looks like $V_b$, $A_b$, $D_b$, $V_e$, $A_e$, $D_e$ are each realized with separate logical circuits, or at least the base streams are a separated logical circuit from the enhanced stream. One way of viewing this is illustrated in FIG. 2 in which a composite piece of data 100 is broken down into base data 104 and enhanced data 110. A header portion 102 and header 108 are illustrated preceding each of the portions of the segmented data. There are alternative methods for representing base data and enhanced data: there may be complete separate streams for each level of enhancement for each type of data (video, audio, or traditional data), or the streams may be bundled by the level of enhancement. By keeping the data streams easily separable, the gateway architecture of the present invention requires less processing capability. The varying methods may each be more desirable in different circumstances. For example, the former method described may be more useful for LANs while the latter may be better used for WAN implementations.

The present invention assumes that the nodes on the enhanced network are capable of generating their data streams in this segmented matter of base data plus enhanced data. While any mechanism implemented for doing this will support use of the present invention protocol, one method for generating video and audio data streams in this manner is discussed in co-pending application Ser. No. 08/159,665, "Multiple Encoder Output Buffer Apparatus for Differential Coding of Video Information", now U.S. Pat. No. 5,416,520 invented by the inventor of the present invention, assigned to the same assignee and filed concurrently herewith. By that invention it is taught that the generation of segmented motion or audio data can be accomplished by the use of multiple output buffers in which a first output buffer from an object source would encompass base data while a subsequent output buffer would encompass the enhanced data stream.

To implement hierarchical coding, in addition to the hierarchical transmission described, application implemented on the enhanced network should be implemented such that their objects are segmented on a connection-based scheme. In this method, the base data may be significantly different in contextual meaning than the enhanced data. The choice of the base data will depend on the bit rate of the connection, the computing capability of the receiving node, the allocation of resources by the transmitter (both bit rate and CPU), and the allocation of resources by the receiver (both bit rate and CPU). For example, a word processing document can be broken down in the following hierarchy:

ASCII text

Font/style/format information

A graphics document can be broken down in the following hierarchy:

Low resolution fax scan

Fax scan residual error for high definition

Object information

In a heterogeneous data conferencing system, the data source can generate the hierarchical data that matches its connectivity type. The higher the data rate of the connection, the higher the number of descriptive levels in the broken down hierarchy.

As was indicated, the present invention concerns a gateway protocol wherein nodes on the enhanced network propagate their data streams as the concatenation of a base data stream plus an enhanced data stream like that illustrated in FIG. 2. In the example of FIG. 1, the WAN end points generate both base and enhanced streams for the video, audio and traditional data conferencing. The LAN end points generate only the base streams for video, audio and data. At the WAN server 20, the complete enhanced streams are shared among all the WAN end points. Similarly, at the LAN server, the base streams are shared among all the LAN end points.

Figure 3:
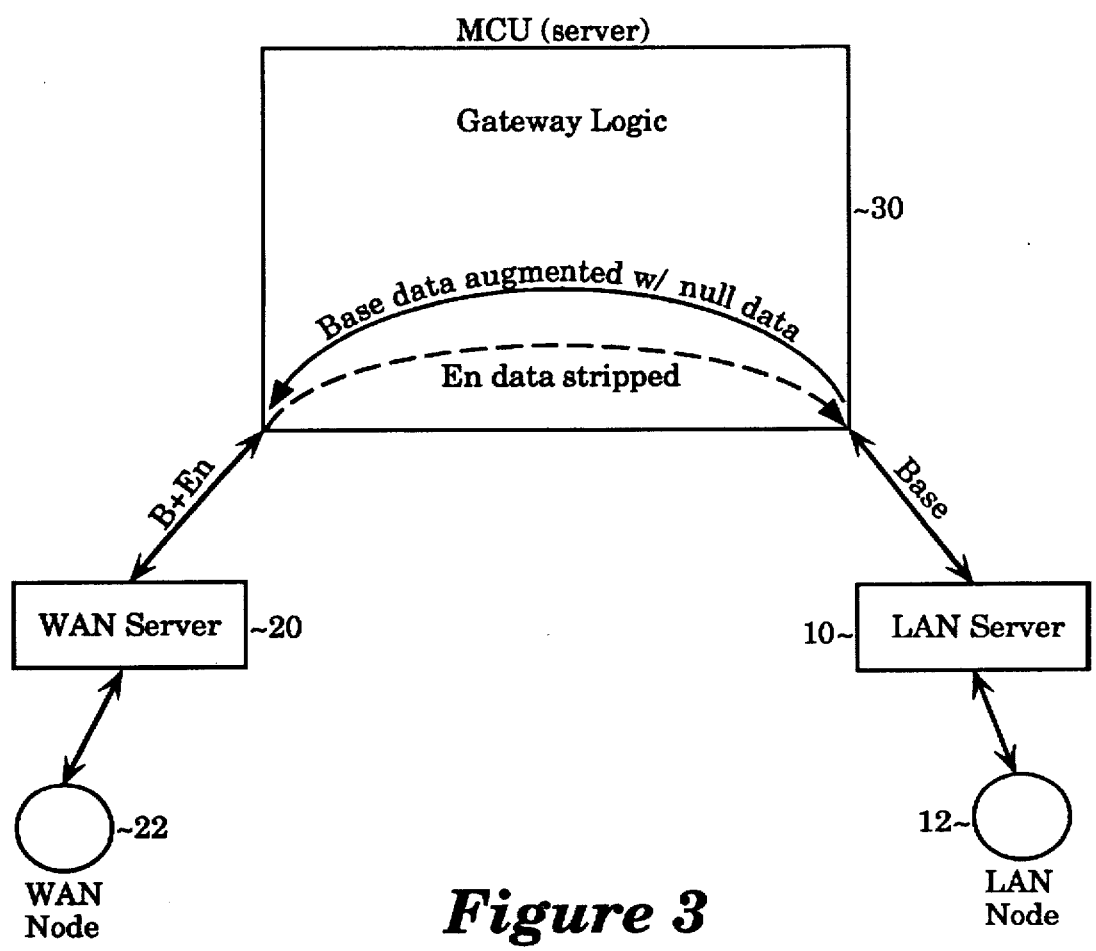
FIG. 3 illustrates graphically the procedure carried out by the present invention internetwork communications gateway.

FIG. 3 illustrates a more detailed view of the gateway logic 30 coupled to the WAN server 20 and the LAN server 10. The gateway 30 serves as a protocol stripper/adder between the WAN and the LAN end points and may also provide multi-point control unit functionality. The LAN end points, or any multimedia conference end points that are capable of only the base operation, generate only the base video, audio or traditional data streams appropriate to the connection level. Data being shared from the WAN connection to the LAN connection has the enhanced component stripped off by the logic implemented in the gateway 30. In the other direction, data from the LAN connection to a WAN end point has null data added to replace the missing enhanced data in the stream. This is illustrated graphically in FIG. 3 in which it is shown that base data is exchanged between the gateway and LAN server 10 while the base data plus enhanced data is shared between the WAN server 20 and the gateway 30. Enhanced data going from the WAN server to the LAN server is stripped so that only the base data is forwarded to the LAN end points, while data from a LAN end point to a WAN end point is augmented with the null data.

The present invention provides numerous advantages particularly as a source of multimedia conferencing across heterogeneous network connections. There is no requirement for the transcoding of natural data between heterogeneous networks. This provides for a less expensive WAN/LAN interface and is faster than transcoding.

There has thus been described a method and apparatus for implementing a protocol for communicating complex information over heterogeneous networks. Although the present invention has been described in terms of preferred and implemented embodiments, it will be appreciated that various modifications and alterations might be made by those skilled in the art without departing from the spirit and scope of the present invention. The invention should, therefore, be measured in terms of the claims which follow.

What is claimed is:

1. An internetwork communications gateway for coupling a first communications network to a second communications network, said first network supporting signal transmissions at a first bit rate and said second network supporting signal transmissions at a second bit rate, said second bit rate being higher than said first bit rate, said first network supporting transmission of a base data type generated by a first application and said second network supporting transmission of an enhanced data type generated by a second application, said enhanced data type comprising base data components and corresponding augmented data components, said base and enhanced data types each comprising distinct data streams wherein contents of said base data type are dependent on characteristics of said first communications network and said second communications network, said gateway for forwarding data between said first and second networks, said gateway for stripping in an application layer the augmented data component from transmissions from said second network to said first network, said gateway adding in said application layer null data to said base data for transmissions from said first network to said second network.

2. The internetwork communications gateway of claim 1 wherein said first network is a local area network and said second network is a wide area network.

3. The internetwork communications gateway of claim 2 wherein said local area network comprises a CSMA LAN and said wide area network comprises an ISDN network.

4. The internetwork communications gateway of claim 2 wherein said base data components and said enhanced data components comprise audio and video information.

5. The internetwork communications gateway of claim 2 wherein applications software implemented on said second network break down resultant objects in a hierarchical manner.

6. A data communications apparatus comprising:

a first network server for implementing a first transmission protocol in an application layer on a first network comprising a first plurality of nodes;

a second network server for implementing a second transmission protocol in said application layer on a second network comprising a second plurality of nodes;

said first network supporting signal transmissions at a first bit rate and said second network supporting signal transmissions at a second bit rate, said second bit rate being higher than said first bit rate; and an internetwork gateway in communication with said first and second network servers, said gateway for facilitating the transmission of data between nodes on said first and second networks to support real-time conferencing, wherein said first transmission protocol comprises base data transmissions generated by a first application and said second transmission protocol comprises enhanced data transmissions generated by a second application, said enhanced data transmissions having base data augmented by enhanced data, said base and enhanced data transmissions each comprising distinct data streams wherein contents of said base data transmission are dependent on characteristics of said first network and said second network.

said intermediate gateway stripping in an application layer enhanced data from data transmissions from said second network to said first network.

said internetwork gateway adding in said application layer null data to data transmissions from said first network to said second network, said null data conforming said transmission to said second transmission protocol.

7. The data communications apparatus of claim 6 wherein said first network is a local area network and said second network is a wide area network supporting signal transmissions at a second bit rate, said second bit rate being higher than said first bit rate.

8. The data communications apparatus of claim 7 wherein said local area network comprises a CSMA LAN and said wide area network comprises an ISDN network.

9. The data communications apparatus of claim 7 wherein said base data components and said enhanced data components comprise audio and video information.

10. The data communications apparatus of claim 7 wherein applications software implemented on stations on said second network break down resultant objects in a hierarchical manner.

11. The data communications apparatus of claim 10 wherein word processing documents are hierarchically broken down into a first component comprising ASCII text and a second component comprising font, style and format information for said word processing documents.

12. The data communications apparatus of claim 10 wherein graphics objects are hierarchically broken down into a first component comprising a low resolution fax scan of said graphics object, a second component comprising residual error of said fax scan, and a third component comprising object information.

13. A method of internetwork communications comprising the steps of:

providing an internetwork gateway between first and second networks, said first networks supporting signal transmissions at a first bit rate and said second networks supporting signal transmissions at a second bit rate, said second bit rate being higher than said first bit rate, said first and second networks implementing first and second transmission protocols wherein data packets used for said first transmission protocol comprise a first quantity of information generated by a first application and data packets used for said second transmission protocol comprise a first quantity of information augmented by a second quantity of information generated by a second application, said data packets used for said first transmission protocol and said data packets used for said second transmission protocol each comprising distinct data streams wherein contents of said data packets used for said first transmission protocol are dependent on characteristics of said first communications network and said second communications network;

exchanging data packets having said first quantity of information between nodes on said first network;

exchanging data packets having said first and second quantities of information between nodes on said second network;

stripping in an application layer said second quantity of information from data packets propagated from a node on said second network to a node on said first network; and adding in said application layer a second quantity of null data to data packets propagated from a node on said first network to a node on said second network.

* * * * *